United States Patent [19]
Jeong

[11] Patent Number: 5,790,498
[45] Date of Patent: Aug. 4, 1998

[54] APPARATUS FOR SELF-RECORDING A COMPACT DISK REPRODUCED SIGNAL ON A VIDEO TAPE IN A VIDEO CASSETTE RECORDER/COMPACT DISK PLAYER COMPLEX SYSTEM

[75] Inventor: Tae-Hwa Jeong, Kwangmyeong, Rep. of Korea

[73] Assignee: Samsung Electronics Co., Ltd., Kyungki-do, Rep. of Korea

[21] Appl. No.: 761,935

[22] Filed: Dec. 9, 1996

[30] Foreign Application Priority Data

Dec. 8, 1995 [KR] Rep. of Korea ............... 47948/1995

[51] Int. Cl.[6] ................................................ G11B 7/00
[52] U.S. Cl. .................................... 369/84; 360/15
[58] Field of Search ......................... 369/84, 85, 83, 369/58, 54, 47, 48; 360/13, 16, 14.1

[56] References Cited

U.S. PATENT DOCUMENTS 5,172,363  12/1992  Greenspun ..................... 369/84 X
5,311,492  5/1994  Tabuchi et al. .................. 369/84 X
5,485,443  1/1996  Niwayama ..................... 369/84 X

*Primary Examiner*—Muhammad N. Edun
*Attorney, Agent, or Firm*—Sughrue, Mion, Zinn, Macpeak & Seas, PLLC

[57] ABSTRACT

An apparatus for self-recording a reproduced signal of a CD player on a video tape without connecting an additional cable in a VCR/CDP complex system. The apparatus has a key input unit for generating various function key signals to drive a video cassette recorder and a compact disk player. A controller controls the video cassette recorder and the compact disk player so as to be driven in response to an input of the function key signals, and generates a video switching select signal and an audio switching select signal. A compact disk reproducing unit reproduces the compact disk under the control of the controller, and generates an audio signal and a video signal. A switching unit supplies the audio signal and the video signal reproduced from the compact disk reproducing unit to the video cassette recorder via the switching select signals of the controller, and the video cassette recorder records the audio signal and the video signal supplied by the switching unit on the video tape.

5 Claims, 2 Drawing Sheets

APPARATUS FOR SELF-RECORDING A COMPACT DISK REPRODUCED SIGNAL ON A VIDEO TAPE IN A VIDEO CASSETTE RECORDER/COMPACT DISK PLAYER COMPLEX SYSTEM

BACKGROUND OF THE INVENTION

1. Field of the Invention

The present invention relates to an apparatus for self-recording a reproduced signal of a compact disk without connecting an additional cable in a video cassette recorder (VCR)/compact disk player (CDP) complex system. The present application is based upon Korean Application No. 47948/1995, which is incorporated herein by reference.

2. Description of the Related Art

Generally, a VCR/CDP complex system is one product having both a VCR and a CDP. The system reproduces CD, CD-G, CD-I, CD-V, etc., and simultaneously reproduces a video tape. One example of a commercially available VCR/CDP complex system is "NV-VCDI" which is manufactured by MATUSHITA Co., Japan. In the "NV-VCDI," the VCR and the CDP have separate constructions, and the final output is coupled by a jack when the video tape or the CD is reproduced. Therefore, if it is desired to record a reproduced signal of the CD on the video tape, an output jack signal of the CDP must be connected via a cable to a line input of the VCR to cause the VCR to be in a line mode, and a recording key of the VCR must be pressed to record the reproduced signal of the CD.

The aforementioned VCR/CDP complex system is therefore inconvenient in that the output jack of the CDP is connected via a cable to the line input of the VCR when reproducing the reproduced signal of the CD on the video tape.

SUMMARY OF THE INVENTION

It is an object of the present invention to provide an apparatus for self-recording a reproduced signal of a CD on a video tape without connecting an additional cable in a VCR/CDP complex system.

According to one aspect of the present invention, an apparatus for self-recording a compact disk reproducing signal in a VCR/CDP complex system includes: a key input unit for generating various function key signals to drive a video cassette recorder and a compact disk; a controller for controlling the video cassette recorder and the compact disk so as to be driven in response to an input of the function key signals, and generating a video switching select signal and an audio switching select signal; a compact disk reproducing unit for reproducing the compact disk by the control of the controller, and generating an audio signal and a video signal; a switching unit for supplying the audio signal and the video signal reproduced from the compact disk reproducing unit to the video cassette recorder by the switching select signals of the controller; and the video cassette recorder for recording the audio signal and the video signal selected from the switching unit.

BRIEF DESCRIPTION OF THE DRAWINGS

A more complete appreciation of this invention, and many of the attendant advantages thereof, will be readily apparent as the invention becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
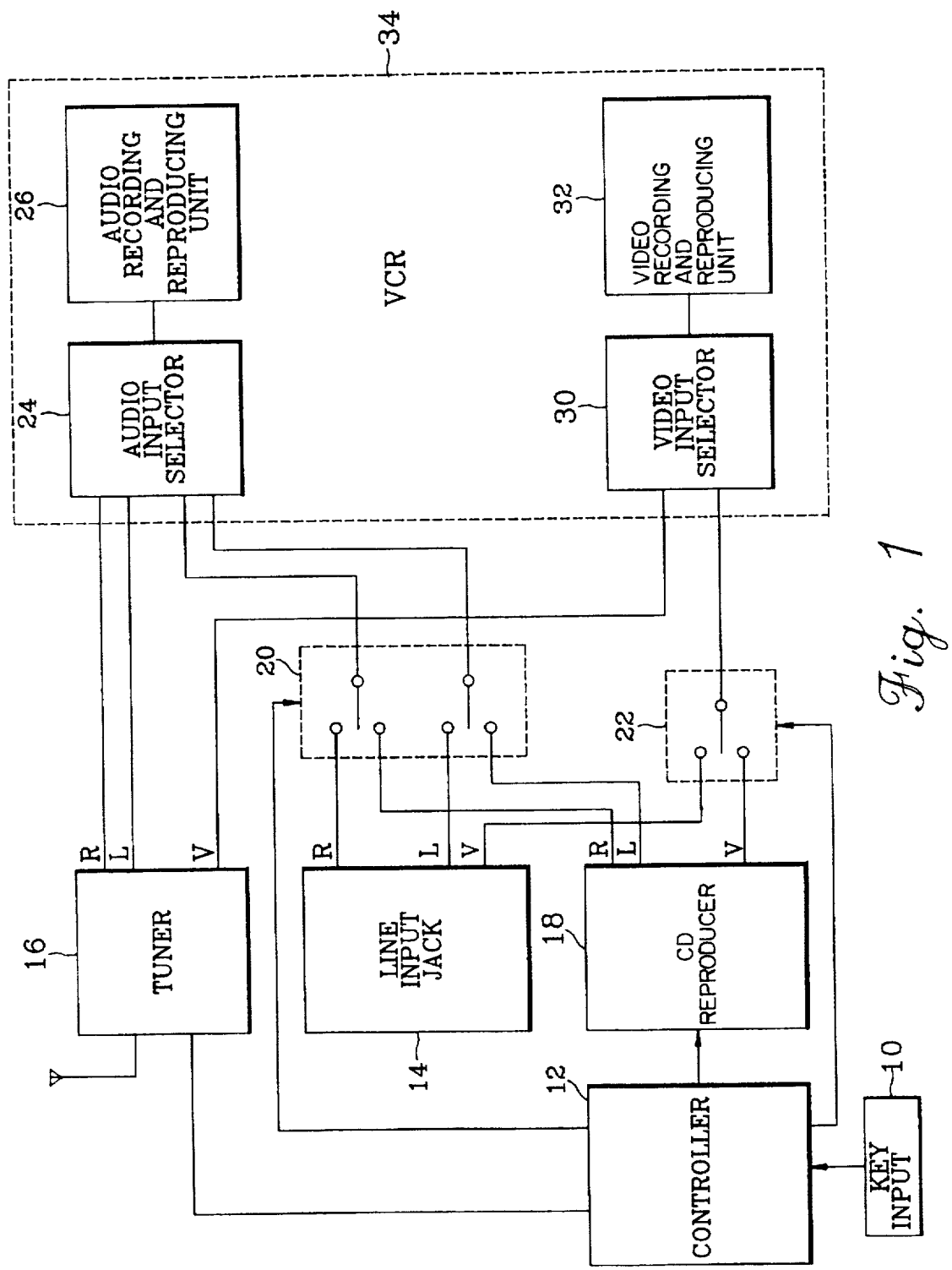
FIG. 1 is a block diagram showing the construction of a VCR/CDP complex system according to the present invention.

Referring to FIG. 1, a key input 10 generates various function key signals for driving a VCR and a CDP. A controller 12 controls the VCR or the CDP so as to be driven in response to an input of the function key signal, and generates a video switching select signal and an audio switching select signal. A line input jack 14 is installed at the front of a VCR/CDP complex system and receives a video signal and audio signals provided from external equipment. A tuner 16 receiving a television broadcasting signal through an antenna selects a corresponding channel under the control of the controller 12 and generates the audio signals and the video signal corresponding to the selected channel. A CD reproducer 18 reproduces the CD under the control of the controller 12 and generates the audio signals and the video signal.

An audio select switch 20 selects one of the pair of audio signals generated from the line input jack 14 and the pair of audio signals reproduced from the CD reproducer 18 based on the audio switching select signal of the controller 12. A video select switch 22 selects one of the video signal generated from the line input jack 14 and the video signal generated from the CD reproducer 18 based on the video switching select signal of the controller 12. An audio input selector 24 selects one of the audio signals generated from the tuner 16 and the audio signals generated from the audio select switch 20. An audio recording and reproducing unit 26 records the audio signals selected by the audio input selector 24 or reproduces the audio signals of a video tape. A video input selector 30 selects one of the video signal generated from the tuner 16 and the video signal selected by the video select switch 22. A video recording and reproducing unit 32 records the video signal selected by the video input selector 30 or reproduces the video signal of the video tape. The audio input selector 24, the audio recording and reproducing unit 26, the video input selector 30 and the video recording and reproducing unit 32 are contained in a VCR 34.

Figure 2:
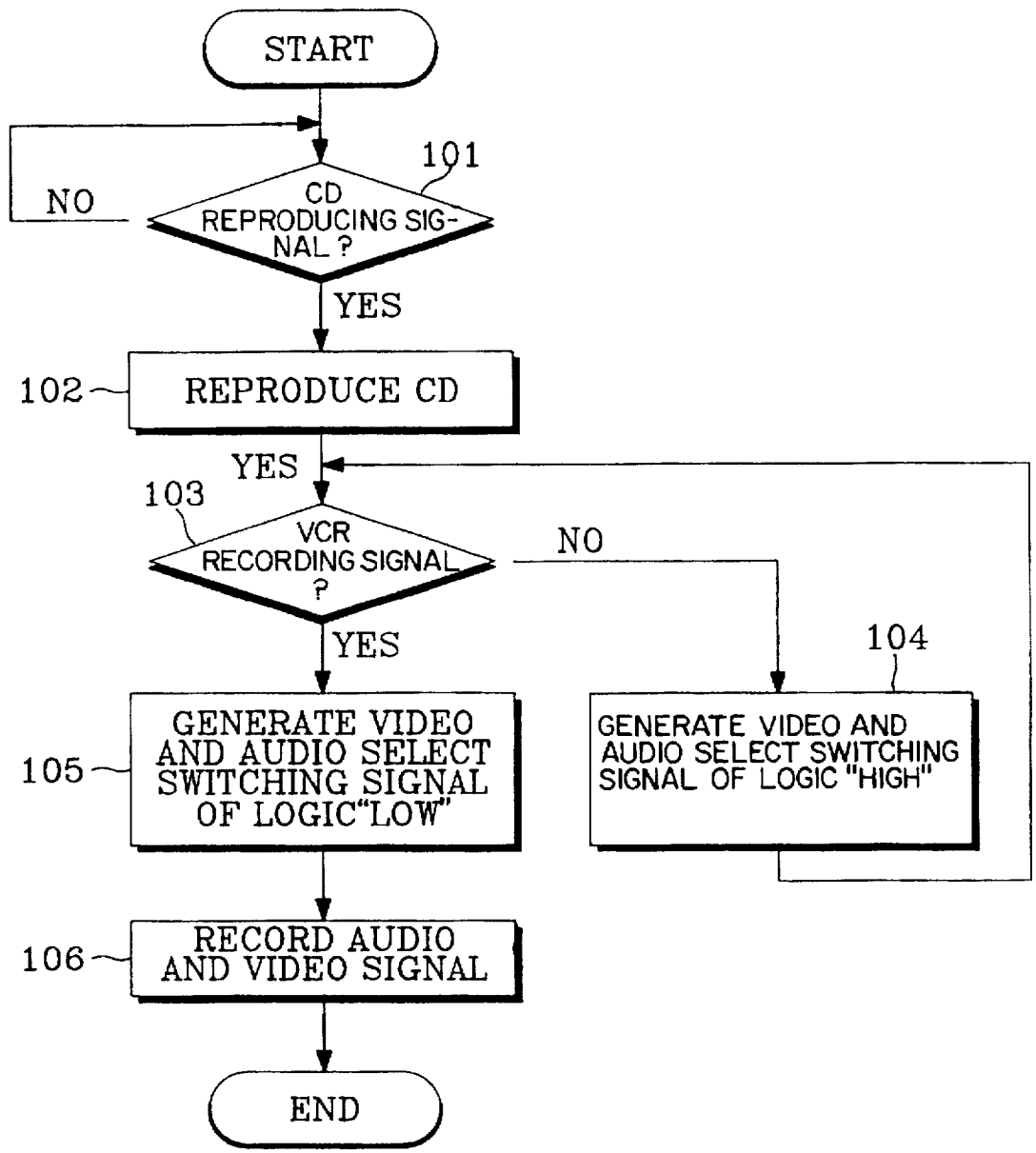
FIG. 2 is a flow chart showing an operation for recording a CD reproduced signal on a VCR video tape according to the present invention.

FIG. 2 shows an operation for recording a CD reproduced signal on the video tape. If a CD reproducing signal is received from the key input 10, the controller 12 reproduces the video signal and/or the audio signal recorded on the CD by controlling the CD reproducer 18. If a VCR reproducing signal is received from the key input 10, the controller 12 reproduces the video signal and/or the audio signal recorded on the video tape by controlling the VCR 34. If a VCR recording signal is received from the key input 10, the controller 12 records the video signal and/or the audio signal on the video tape by controlling the VCR 34.

During the operation for recording the CD reproducing signal on the video tape of the VCR, the controller 12 checks, at step 101 shown in FIG. 2, whether the CD reproducing signal is received from the key input 10. If so, the controller 12 reproduces, at step 102, the video signal and/or the audio signal recorded on the CD by controlling the CD reproducer 18. The controller 12 checks, at step 103, whether the VCR recording signal is received from the key input 10. If not, the controller 12 supplies, at step 104, the audio and video select switching signals of logic "high" to the audio and video select switches 20 and 22, respectively. Then the audio select switch 20 and the video select switch 22 are connected to the line input jack 14. If the VCR recording signal is received from the key input 10 at step 103, the controller 12 supplies, at step 105, the audio and video select switching signals of logic "low" to the audio and video select switches 20 and 22, respectively. Then the audio select switch 20 and the video select switch 22 are connected to the CD reproducer 18. Hence, the audio signals R and L generated from the CD reproducer 18 are supplied to the audio input selector 24, and the video signal V generated from the CD reproducer 18 is applied to the video input selector 30. The audio input selector 24 supplies the CD reproduced audio signals R and L selected by the audio select switch 20 to the audio recording and reproducing unit 26. The video input selector 30 supplies the CD reproduced video signal V selected by the video select switch 22 to the video recording and reproducing unit 32. The audio signals R and L and the video signal V reproduced from the CD reproducer 18 are recorded on the video tape at step 106.

As described above, the output of the CDP is not again supplied to the input line of the VCR and the CD reproducing signal is recorded on the VCR by the switching control operation of the controller. Consequently, the reproducing signal of the CDP can be recorded on the video tape without using an additional cable.

While the present invention has been described and illustrated with reference to a preferred embodiment thereof, it is to be, readily understood that the present invention is not limited to the embodiment, and various changes and modifications can be made therein without departing from the spirit and scope of the invention defined in the appended claims.

What is claimed is:

1. An apparatus for self-recording a compact disk reproduced signal in a video cassette recorder/compact disk player complex system, comprising:

a key input unit for generating various function key signals to drive a video cassette recorder and a compact disk player of said complex system;

a controller for controlling said video cassette recorder and said compact disk player so as to be driven in response to an input of said function key signals, and generating a video switching select signal and an audio switching select signal;

a compact disk reproducing unit for reproducing said compact disk under the control of said controller, and for generating an audio signal and a video signal; and a switching unit for selecting between said audio and video signals generated by said compact disk reproducing unit and signals other than said audio and video signals generated by said compact disk reproducing unit according to said switching select signals of said controller, and supplying the selected audio and video signals to said video cassette recorder;

said video cassette recorder for recording said audio and video signals supplied by said switching unit on a video tape of said video cassette recorder.

2. An apparatus as set forth in claim 1, wherein said switching unit comprises:

an audio select switch for selecting said audio signal generated by said compact disk reproducing unit according to said audio switching select signal of said controller; and a video select switch for selecting said video signal generated by said compact disk reproducing unit according to said video switching select signal of said controller.

3. An apparatus for self-recording a compact disk reproduced signal in a video cassette recorder/compact disk player complex system, comprising:

a key input unit for generating various function key signals for driving a video cassette recorder and a compact disk player of said complex system;

a controller for controlling said video cassette recorder and said compact disk player so as to be driven in response to an input of said function key signals, and for generating a video switching select signal and an audio switching select signal;

a line input jack for receiving an external video signal and an external audio signal provided from external equipment, said line input jack being installed at the front of said video cassette recorder/compact disk player complex system;

a compact disk reproducing unit for reproducing said compact disk under the control of said controller, and for generating a compact disk audio signal and a compact disk video signal;

an audio select switch for selecting one of said external audio signal and said compact disk audio signal according to said audio switching select signal of said controller; and a video select switch for selecting one of said video signal generated from said line input jack and said video signal generated by said compact disk reproducing unit according to said video switching select signal of said controller;

said video cassette recorder for recording said audio signal selected by said audio select switch and said video signal selected by said video select switch on a video tape of said video cassette recorder.

4. A method for self-recording a compact disk reproduced signal in a video cassette recorder/compact disk player complex system, comprising the steps of:

generating various function key signals to drive a video cassette recorder and a compact disk player of said complex system;

controlling said video cassette recorder and said compact disk player to be driven in response to an input of said function key signals, and generating a video switching select signal and an audio switching select signal;

reproducing said compact disk, and generating an audio signal and a video signal;

selecting between said audio and video signals generated from said compact disk and signals other than said audio and video signals generated from said compact disk according to said switching select signals, and supplying the selected audio and video signals to said video cassette recorder; and recording said selected audio and video signals on a video tape of said video cassette recorder.

5. A method for self-recording a compact disk reproduced signal in a video cassette recorder/compact disk player complex system, comprising the steps of:

generating various function key signals for driving a video cassette recorder and a compact disk player of said complex system; controlling said video cassette recorder and said compact disk player to be driven in response to said function key signals, and generating a video switching select signal and an audio switching select signal;

receiving an external video signal and an external audio signal;

reproducing said compact disk, and generating a compact disk audio signal and a compact disk video signal;

selecting one of said external audio signal and said compact disk audio signal according to said audio switching select signal;

selecting one of said external video signal and said compact disk video signal according to said video switching select signal; and recording said selected audio signal and said selected video signal on a video tape of said video cassette recorder.

* * * * *